United States Patent Office 3,069,408
Patented Dec. 18, 1962

3,069,408
WATER-INSOLUBLE AZO DYESTUFFS
Ernest Merian, Bottmingen, and Bruno J. R. Nicolaus, Basel, Switzerland, assignors to Sandoz Ltd., Basel, Switzerland, a Swiss firm
No Drawing. Filed June 1, 1959, Ser. No. 817,040
Claims priority, application Switzerland July 18, 1956
6 Claims. (Cl. 260—153)

The present application is a continuation-in-part of copending application Ser. No. 671,418, filed July 12, 1957, now abandoned, and relates to new water-insoluble azo dyestuffs and to a process for their production.

The new water-insoluble azo dyestuffs are suitable for dyeing secondary cellulose acetate and cellulose triacetate in the mass. A number of the dyestuffs also have affinity for cellulose ester fibers and synthetic polyamide fibers, e.g. nylon and "Perlon" (registered trademark), polyvinyl fibers, and terephthalic acid ester fibers, e.g. "Terylene," "Dacron" (registered trademarks). They are applied to the latter named fibers at elevated temperature and preferably in the presence of compounds with dispersing action. Those dyestuffs which are sparingly soluble or insoluble in organic solvents can also be employed with success as pigments.

A selection of the dyestuffs in question is suitable for the pigmentation of oils, lacquer media and synthetic resins. Some of them also dye wool and silk.

The disclosed dyestuffs are applied from suspension to the aforenamed fibers to give yellow-orange to violet dyeings which are characterized by excellent fastness to washing, sea water, sublimation, perspiration, ironing, heat setting and gas fumes. The dyeings have good light fastness on polyamide fibers and very good to outstanding light fastness on the other fibers.

Spun-dyed shades exhibit good to very good fastness to light, water, washing, perspiration, cross dyeing, chlorination in alkaline medium, sublimation, oxalic acid, dry cleaning, gas fumes, rubbing, ironing, peroxide bleaching and heat setting.

The new water-insoluble azo dyestuffs correspond to the formula

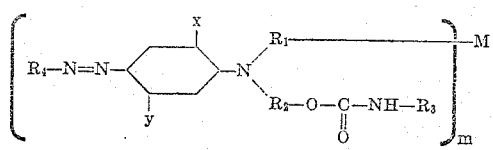

wherein:

$m$ stands for the figure 1 or 2,
$x$ represents hydrogen, halogen, the methyl, ethyl, methoxy or ethoxy radical,
$y$ hydrogen, halogen, the methyl, ethyl, trifluoromethyl, methoxy or ethoxy radical, or an alkanoylamino radical having not more than 18 carbon atoms,
$R_1$ an alkylene radical with 1 to 4 carbon atoms,
$R_2$ an alkylene radical with 2 to 4 carbon atoms,
$R_3$ an aromatic radical which may contain further substituents except water-solubilizing groups, M hydrogen, halogen, the methoxy, ethoxy, difluoromethyl, trifluoromethyl, cyano or carbalkoxy radical, or

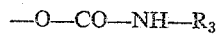

where $R_3$ has the previously stated meaning, or a simple linkage when $m$ stands for the figure 2, and
$R_4$ a mononuclear aromatic, a mononuclear heterocyclic or a dinuclear heterocyclic radical containing further substituents commonly present in azo dyestuffs with the exception of water-solubilizing groups.

Especially interesting dyestuffs are the monoazo dyestuffs which correspond to the formula

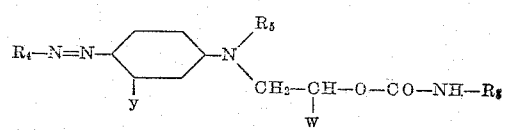

wherein $y$ represents hydrogen, chlorine, methyl, trifluoromethyl or an alkanoylamino radical having not more than 18 carbon atoms,
$w$ represents hydrogen or methyl,
$R_5$ represents ethyl, cyanoethyl, difluoroethyl or trifluoroethyl,
$R_3$ represents phenyl, and
$R_4$ represents a mononuclear aromatic, a mononuclear heterocyclic or a dinuclear heterocyclic radical substituted by chlorine, nitro, trifluoromethyl or methylsulfonyl,
and the disazo dyestuffs which correspond to the formula:

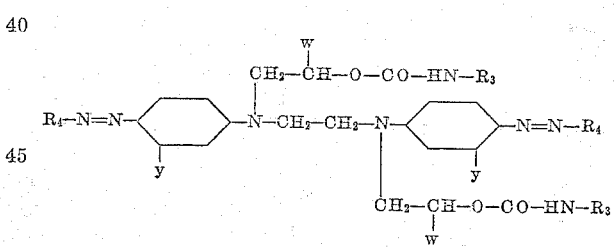

wherein:

$y$ represents hydrogen, chlorine, methyl, trifluoromethyl or an alkanoylamino radical having not more than 18 carbon atoms,
$w$ represents hydrogen or methyl,
$R_3$ represents phenyl, and
$R_4$ represents a mononuclear aromatic, a mononuclear heterocyclic or a dinuclear heterocyclic radical substituted by chlorine, nitro, trifluoromethyl or methylsulfonyl.

The process for their production consists in coupling $m$ moles of a diazo compound containing further substituents commonly present in azo dyestuffs with the exception of water-solubilizing groups with 1 mol of a tertiary amine of the formula

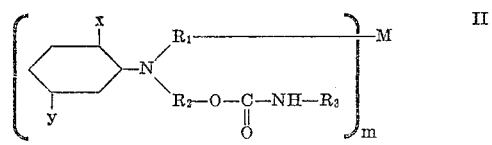

wherein $x$, $y$, $R_1$, $R_2$, $R_3$, M and $m$ possess the above-named meanings.

Suitable diazo components free from water-solubilizing groups are aminobenzenes, aminothiazoles, aminothiodiazoles or aminobenzenethiazoles substituted by halogen atoms, nitro, acyl, cyano and/or alkylsulfonyl groups.

The diazo compound is coupled with the coupling component in acid medium, which may be buffered if desired.

In the following examples all parts and percentages are by weight. The temperatures are in degrees centigrade and the melting points are uncorrected.

EXAMPLE 1

17.5 parts of 1-amino-2-chloro-4-nitrobenzene, 125 parts of water and 42.5 parts of hydrochloric acid 30% are mixed together, stirred for some time and then diazotized by the addition of a solution of 7 parts of sodium nitrite and 25 parts of water at 0°. The resulting diazo solution is given 0.5 part of amidosulfonic acid and then stirred for some time and filtered. The filtrate is united with a solution of 26 parts of the phenyl carbamic acid ester of 1-(N-ethyl-N-β-hydroxyethyl)-amino-3-methylbenzene, 100 parts of acetic acid and 200 parts of water at 0°. Following this a solution of 70 parts of sodium acetate in 100 parts of water is added dropwise. After some time the coupling reaction is completed. The precipitated dyestuff is filtered off and dried.

The phenyl carbamic acid ester of the 1-[4'-(N-ethyl-N-β-hydroxyethyl) - amino - 2' - methyl] - phenylazo - 2-chloro-4-nitrobenzene is obtained in good yield. The new product crystallizes from ethanol in attractive red crystals, dissolves in ethyl acetate or acetone with a red coloration and dyes cellulose acetate fibers in the spinning solution in scarlet shades.

The following procedure is used for dyeing cellulose acetate in the spinning solution:

100 parts of cellulose acetate are added to 400 parts of a solvent mixture of 93% acetone and 7% methanol. The mass is stirred for a short time and left overnight to swell. 0.5 part of the monoazo dyestuff obtainable according to Example 1 is dissolved in 60 parts of the same solvent mixture by simple agitation. This solution is added to the cellulose acetate solution and the mixture stirred in an open vessel until 60 parts of the solvent have evaporated. The dyed mass is pumped into the spinning pot and spun in the normal way. The filaments are dyed scarlet-red; they possess very good fastness properties.

When the same quantity of the above-named diazo compound is coupled with 30 parts of the phenyl carbamic acid ester of 1-(N-β-cyanoethyl-N-β-hydroxyethyl)-amino-3-methylbenzene in the same manner, a red dyestuff which melts at 135° is obtained.

In the following Table 1 further valuable monoazo dyestuffs are described which may be obtained by suitable replacement of the diazo and coupling components used in Example 1. These dyestuffs have the general formula

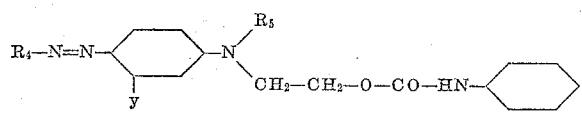

They are characterized in the table by the symbols $R_4$, $R_5$ and $y$ and by their melting points.

*Table 1*

| Ex. No. | $R_4$ | $y$ | $R_5$ | M.P., °C. |
|---|---|---|---|---|
| 2 | 2-chloro-4-nitrophenyl | Methyl | Ethyl | 186 |
| 3 | 4-nitrophenyl | Hydrogen | do | 170 |
| 4 | do | Methyl | do | 173 |
| 5 | do | Hydrogen | do | 184 |
| 6 | 2-chloro-4-methylsulfonylphenyl | Methyl | do | 133 |
| 7 | do | do | Phenyl carbamic acid ethyl | 180 |
| 8 | 4-nitrophenyl | do | do | 186 |

The following Table 2 contains further valuable monoazo dyestuffs corresponding to the formula

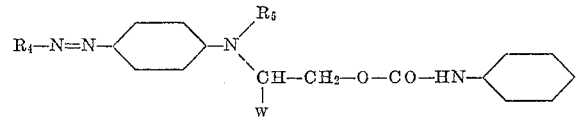

They are obtainable in the manner described in the Example 1 and are characterized by the symbols $R_4$, $R_5$ and $w$ in Columns (I) to (III) and by the shade produced in solution-dyed cellulose acetate in Column (IV).

*Table 2*

| Ex. No. | (I) $R_4$ | (II) $R_5$ | (III) $w$ | (IV) Shade in cellulose acetate |
|---|---|---|---|---|
| 9 | 4-nitrophenyl | Ethyl | Hydrogen | Scarlet. |
| 10 | do | do | Methyl | Do. |
| 11 | do | 2-cyanoethyl | Hydrogen | Do. |
| 12 | do | 2-difluoroethyl | do | Do. |
| 13 | do | 2-trifluoroethyl | do | Orange. |
| 14 | 4-nitro-2-chlorophenyl | do | do | Scarlet. |
| 15 | do | Ethyl | do | Red. |
| 16 | do | do | do | Red. |
| 17 | 4-nitro-2-methylsulfonylphenyl | do | Methyl | Scarlet-red. |
| 18 | do | do | Hydrogen | Do. |
| 19 | do | 2-cyanethyl | do | Do. |
| 20 | 4-methylsulfonylphenyl | do | do | Orange-yellow. |
| 21 | do | Ethyl | do | Orange. |
| 22 | 2,4-bis-(methylsulfonyl)-phenyl | do | do | Do. |
| 23 | do | 2-difluoroethyl | do | Do. |
| 24 | do | do | Methyl | Do. |
| 25 | 4-nitro-2-cyanophenyl | Ethyl | Hydrogen | Red. |
| 26 | do | 2-trifluoroethyl | do | Red. |
| 27 | do | 2-cyanethyl | do | Red. |
| 28 | 4-nitro-2-fluorosulfonylphenyl | Ethyl | do | Violet. |
| 29 | do | 2-trifluoroethyl | do | Red. |
| 30 | 4-nitro-2-trifluoromethylphenyl | do | do | Yellow. |
| 31 | do | 2-cyanoethyl | do | Orange. |
| 32 | do | Ethyl | do | Do. |
| 33 | 5-nitrothiazolyl-2 | do | do | Violet. |
| 34 | do | 2-difluoroethyl | do | Red-violet. |
| 35 | 6-nitrobenzothiazolyl-2 | Ethyl | do | Red. |
| 36 | do | 2-trifluoroethyl | do | Scarlet. |
| 37 | do | Methyl | do | Red. |
| 38 | 5-methylsulfonylbenzothiazolyl-2 | Ethyl | do | Red. |
| 39 | do | 2-chloroethyl | do | Red. |
| 40 | do | 2-cyanoethyl | do | Red. |
| 41 | 2-chloro-4-methylsulfonylphenyl | 2-trifluoroethyl | do | Orange red. |
| 42 | do | n-Propyl | do | Scarlet. |

Table 3 contains valuable water-insoluble monoazo dyestuffs which correspond to the formula

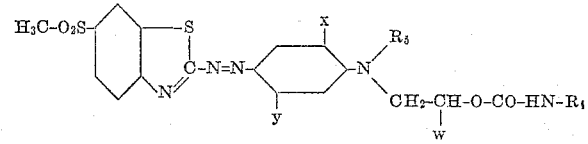

and are characterized by the symbols $x$, $y$, $w$, $R_3$ and $R_5$ in Columns (I) to (V) and by the shade produced in solution-dyed cellulose acetate in Column (VI).

Table 3

| Ex. No. | (I) x | (II) y | (III) w | (IV) R₃ | (V) R₅ | (VI) Shade in cellulose acetate |
|---|---|---|---|---|---|---|
| 46 | Hydrogen | Methyl | Hydrogen | Phenyl | Methyl | Violet. |
| 47 | ---do--- | ---do--- | ---do--- | ---do--- | Ethyl | Red-violet. |
| 48 | ---do--- | ---do--- | ---do--- | ---do--- | Propyl | Do. |
| 49 | ---do--- | ---do--- | ---do--- | ---do--- | Butyl | Do. |
| 50 | ---do--- | ---do--- | ---do--- | ---do--- | 2-chloroethyl | Red. |
| 51 | ---do--- | ---do--- | ---do--- | ---do--- | 2-methoxyethyl | Red. |
| 52 | ---do--- | ---do--- | ---do--- | ---do--- | 2-ethoxyethyl | Red. |
| 53 | ---do--- | ---do--- | ---do--- | ---do--- | 2-(carbomethoxy)-ethyl | Scarlet red. |
| 54 | ---do--- | ---do--- | ---do--- | ---do--- | 2-phenylcarbaminic acid ethyl ester | Red. |
| 55 | ---do--- | ---do--- | Methyl | ---do--- | Ethyl | Red. |
| 56 | ---do--- | ---do--- | ---do--- | 4'-methyl-phenyl | ---do--- | Red. |
| 57 | ---do--- | ---do--- | ---do--- | 2'-4'-dimethyl-phenyl | ---do--- | Red. |
| 58 | ---do--- | ---do--- | ---do--- | 4'-methoxy-phenyl | ---do--- | Red. |
| 59 | ---do--- | ---do--- | ---do--- | 4'-isopropyl-phenyl | ---do--- | Red. |
| 60 | Chlorine | Hydrogen | Hydrogen | Phenyl | 2-phenylcarbaminic acid ethyl ester | Scarlet red. |
| 61 | Bromine | ---do--- | ---do--- | ---do--- | ---do--- | Do. |
| 62 | Methyl | ---do--- | ---do--- | ---do--- | ---do--- | Do. |
| 63 | Ethyl | ---do--- | ---do--- | ---do--- | ---do--- | Do. |
| 64 | Methoxy | ---do--- | ---do--- | ---do--- | ---do--- | Do. |
| 65 | Ethoxy | ---do--- | ---do--- | ---do--- | ---do--- | Do. |
| 66 | Hydrogen | Chlorine | ---do--- | ---do--- | ---do--- | Scarlet. |
| 67 | ---do--- | Bromine | ---do--- | ---do--- | ---do--- | Do. |
| 68 | ---do--- | Ethyl | ---do--- | ---do--- | ---do--- | Red. |
| 69 | ---do--- | Methoxy | ---do--- | ---do--- | ---do--- | Red. |
| 70 | ---do--- | Ethoxy | ---do--- | ---do--- | ---do--- | Red. |
| 71 | ---do--- | Acetylamino | ---do--- | ---do--- | ---do--- | Violet. |
| 72 | ---do--- | Propionylamino | ---do--- | ---do--- | ---do--- | Do. |
| 73 | ---do--- | Butyrylamino | ---do--- | ---do--- | ---do--- | Do. |
| 74 | ---do--- | Chloracetylamino | ---do--- | ---do--- | ---do--- | Red-violet. |
| 75 | ---do--- | Trifluoro-acetylamino | ---do--- | ---do--- | Ethyl | Red. |
| 76 | ---do--- | Decanoylamino | ---do--- | ---do--- | ---do--- | Red-violet. |
| 77 | ---do--- | Hexadecanoylamino | ---do--- | ---do--- | ---do--- | Do. |
| 78 | ---do--- | Octadecanoylamino | ---do--- | ---do--- | ---do--- | Do. |

EXAMPLE 79

20.5 parts of 1-amino-2-chloro-4-methylsulfonylbenzene, 125 parts of water and 42.5 parts of hydrochloric acid 30% are mixed together, stirred for a short time and then diazotized by the addition of a solution of 7 parts of sodium nitrite and 25 parts of water at 0°. To the resultant diazo solution is added 0.5 part of amidosulfonic acid, and after further stirring the solution is filtered. The filtrate is united with a solution of 27 parts of the bis-phenylcarbamic acid ester of N.N'-bis-phenyl-N.N'-bis-(2'-hydroxyethyl)-ethylene diamine in 250 parts of formic acid 80% at 0°, after which a solution of 70 parts of sodium acetate in 100 parts of water is added dropwise. After some time coupling is completed. The precipitated disazo dyestuff is filtered off and dried. A good yield is obtained. The dyestuff dissolves in ethyl acetate with a red coloration and dyes cellulose acetate in the mass in scarlet-red shades.

EXAMPLE 80

7.5 parts of sodium nitrite are run into 60 parts of sulfuric acid (98%) at 60°. The resultant nitrosylsulfuric acid is cooled to 10° and diluted with 140 parts of glacial acetic acid. Then 45.6 parts of 2-amino-6-methylsulfonylbenzothiazole are added. After about 2 hours the excess nitrite is destroyed by an addition of urea; the resulting diazo solution at 5° is united with a solution of 27 parts of the bis-phenylcarbamic acid ester of the N.N'-bis-phenyl-N.N'-bis-(2'-hydroxyethyl) - ethylene diamine in 100 parts of glacial acetic acid. After some time the coupling is completed. Upon further treatment a red dyestuff is obtained which when re-crystallized from ethyl alcohol melts at 112° and dyes cellulose acetate in the mass in brilliant red shades of excellent fastness.

When the same quantity of the above-mentioned diazo compound is united with 42 parts of the bis-phenylcarbamic acid ester of N.N-bis(2'-hydroxyethyl)-aminobenzene, a red dyestuff is obtained with a melting point at 110° and an acetone-solubility of 80 grams per liter. It dyes cellulose acetate in the mass in very fast and brilliant red shades.

In Table 4 are listed valuable disazo dyestuffs corresponding to the formula

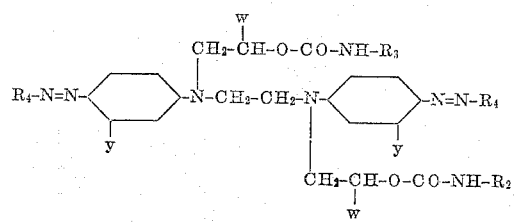

They are obtainable according to the indications given in Examples 79 and 80 and are characterized by the symbols $w$, $y$, $R_3$ and $R_4$ in Columns (I) to (IV) and by the shade produced in solution-dyed cellulose acetate in Column (V).

Table 4

| Ex. No. | (I) w | (II) y | (III) R₃ | (IV) R₄ | (V) Shade in cellulose acetate |
|---|---|---|---|---|---|
| 81 | Hydrogen | Hydrogen | Phenyl | 2.4-bis-(methylsulfonyl)-phenyl | Orange. |
| 82 | ---do--- | ---do--- | ---do--- | 4-nitro-2-cyanophenyl | Red. |
| 83 | ---do--- | ---do--- | ---do--- | 4-nitro-2-fluorosulfonylphenyl | Violet. |
| 84 | ---do--- | ---do--- | ---do--- | 4-nitro-2-trifluoromethylphenyl | Orange. |
| 85 | ---do--- | ---do--- | ---do--- | 5-nitrothiazolyl-2 | Violet. |
| 86 | ---do--- | ---do--- | ---do--- | 6-nitrobenzothiazolyl-2 | Red. |
| 87 | ---do--- | ---do--- | ---do--- | 6-methylsulfonylbenzothiazolyl-2 | Red. |
| 88 | Methyl | Methyl | ---do--- | ---do--- | Violet. |
| 89 | ---do--- | Chlorine | ---do--- | ---do--- | Scarlet-red. |
| 90 | ---do--- | Trifluoromethyl | ---do--- | ---do--- | Violet. |
| 91 | ---do--- | Methoxy | ---do--- | ---do--- | Do. |
| 92 | ---do--- | Ethoxy | ---do--- | ---do--- | Do. |
| 93 | ---do--- | Acetylamino | ---do--- | ---do--- | Blue-violet. |
| 94 | ---do--- | Trifluoroacetylamino | ---do--- | ---do--- | Red-violet. |

Formulae of representative dyestuffs of the foregoing examples are

EXAMPLE 1

First dyestuff:

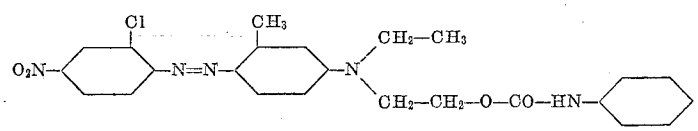

Second dyestuff:

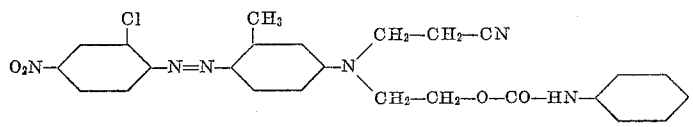

EXAMPLE 27

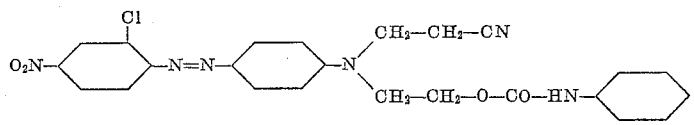

EXAMPLE 40

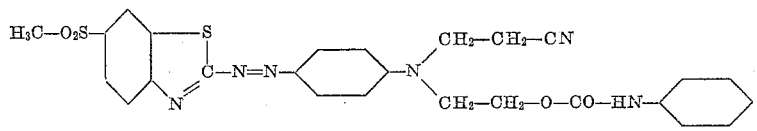

EXAMPLE 54

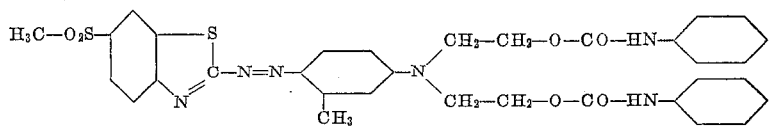

EXAMPLE 66

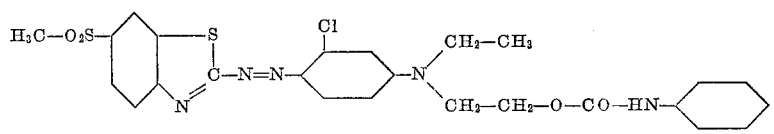

EXAMPLE 79

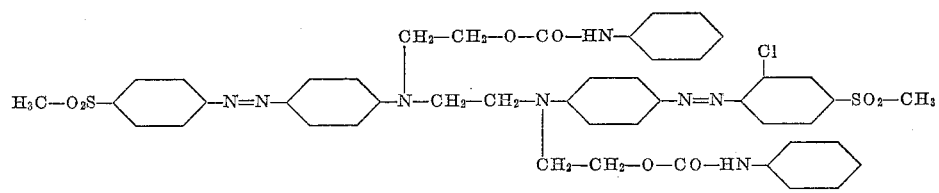

EXAMPLE 80

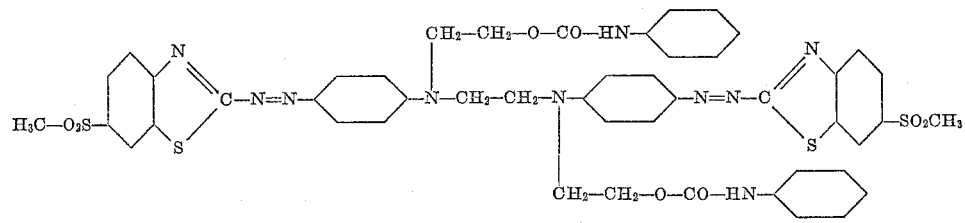

Having thus disclosed the invention what is claimed is:

1. A water-insoluble azo dyestuff, free from carboxylic acid, sulfonic acid and sulfonamide groups, of the formula

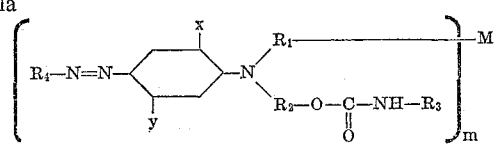

wherein:

$m$ is one of the integers of 1 and 2;

$x$ represents a member selected from the group consisting of hydrogen, chlorine, methyl, ethyl, bromine, methoxy and ethoxy;

$y$ represents a member selected from the group consisting of hydrogen, chlorine, bromine, methyl, ethyl, trifluoromethyl, methoxy, ethoxy and an alkanoylamino radical having not more than 18 carbon atoms;

$R_1$ represents an alkylene radical with from 1 to 4 carbon atoms;

$R_2$ represents an alkylene radical with from 2 to 4 carbon atoms;

$R_3$ represents a member selected from the group consisting of phenyl, lower alkylphenyl, dimethylphenyl and methoxyphenyl;

M represents a member selected from the group consisting of hydrogen, chlorine, bromine, methoxy, ethoxy, difluoromethl, trifluoromethyl, cyano, a lower carbalkoxy radical and the radical —O—CO—NH—$R_3$, where $R_3$ has the previously stated meaning when $m$ stands for the figure 1 and and represents a simple linkage when $m$ stands for the figure 2; and $R_4$ represents a member selected from the group consisting of;

(a) phenyl substituted with from one to two negative substituents independently selected from the group consisting of chloro, nitro, fluorosulfonyl, trifluoromethyl and cyano;

(b) mono-methylsulfonyl-phenyl;
(c) methylsulfonyl-mononitrophenyl;

(e) bis-methylsulfonyl-phenyl;
(f) thiazolyl substituted with one negative substituent selected from the group consisting of chloro, nitro, fluorosulfonyl, trifluoromethyl and cyano; and
(g) benzothiazolyl substituted with one negative substituent selected from the group consisting of nitro and methylsulfonyl.

2. The water-insoluble azo dyestuff which corresponds to the formula

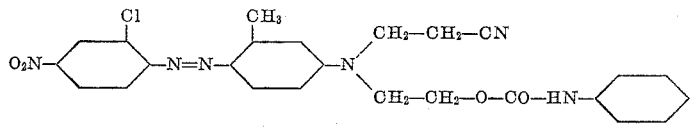

3. The water-insoluble azo dyestuff which corresponds to the formula

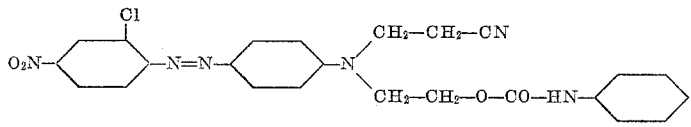

4. The water-insoluble azo dyestuff which corresponds to the formula

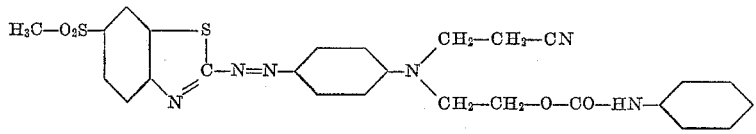

5. The water-insoluble azo dyestuff which corresponds to the formula

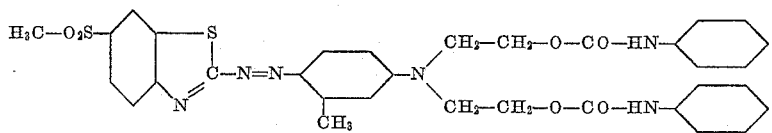

6. The water-insoluble azo dyestuff which corresponds to the formula

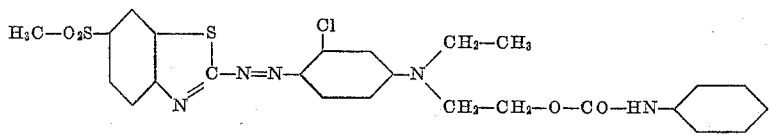

References Cited in the file of this patent
UNITED STATES PATENTS

| | | |
|---|---|---|
| 2,238,486 | Dickey et al. | Apr. 15, 1941 |
| 2,677,698 | Deutschman et al. | May 4, 1954 |
| 2,785,157 | Straley et al. | Mar. 12, 1957 |
| 2,967,858 | Merian et al. | Jan. 10, 1961 |
| 3,007,915 | Merian | Nov. 7, 1961 |